(12) United States Patent
Heemskerk et al.

(10) Patent No.: US 8,715,044 B2
(45) Date of Patent: May 6, 2014

(54) METHOD AND APPARATUS FOR PROCESSING SLAUGHTERED POULTRY

(75) Inventors: Wilhelmus Johannes Casper Heemskerk, Oostzaan (NL); Bastiaan Robert Willemse, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 126 days.

(21) Appl. No.: 13/524,702

(22) Filed: Jun. 15, 2012
(Under 37 CFR 1.47)

(65) Prior Publication Data
US 2013/0029573 A1 Jan. 31, 2013

(30) Foreign Application Priority Data

Jun. 15, 2011 (NL) ...................................... 2006943

(51) Int. Cl.
*A22B 3/00* (2006.01)

(52) U.S. Cl.
USPC .......................................................... 452/57

(58) Field of Classification Search
USPC ............ 452/52, 53, 57, 63, 67, 149–155, 158
See application file for complete search history.

(56) References Cited

U.S. PATENT DOCUMENTS

| | | | |
|---|---|---|---|
| 5,082,373 A | 1/1992 | Rohde et al. | |
| 5,980,377 A * | 11/1999 | Zwanikken et al. | 452/184 |
| 6,912,434 B2 * | 6/2005 | van den Nieuwelaar et al. | 700/116 |
| 8,572,864 B2 * | 11/2013 | Wieck et al. | 34/381 |

FOREIGN PATENT DOCUMENTS

EP        0 819 381        10/2003

OTHER PUBLICATIONS

Search report for NL 2006943, dated Jan. 3, 2012.

* cited by examiner

*Primary Examiner* — Richard Price, Jr.
(74) *Attorney, Agent, or Firm* — Dority & Manning, P.A.

(57) ABSTRACT

A method and apparatus for processing slaughtered poultry that is conveyed in a slaughter line of a slaughter house is provided in order to determine at the start of the slaughter line whether the poultry was alive or dead on arrival at the slaughter house. The method and apparatus can include the detection of a temperature of the slaughtered poultry when the poultry is suspended by the legs in the slaughter line after stunning the poultry. The temperature of at least a breast of the slaughtered poultry is detected. The temperature of other regions of the slaughtered poultry may also be detected and may be compared. Further action may be taken based on the temperature information obtained.

18 Claims, 1 Drawing Sheet

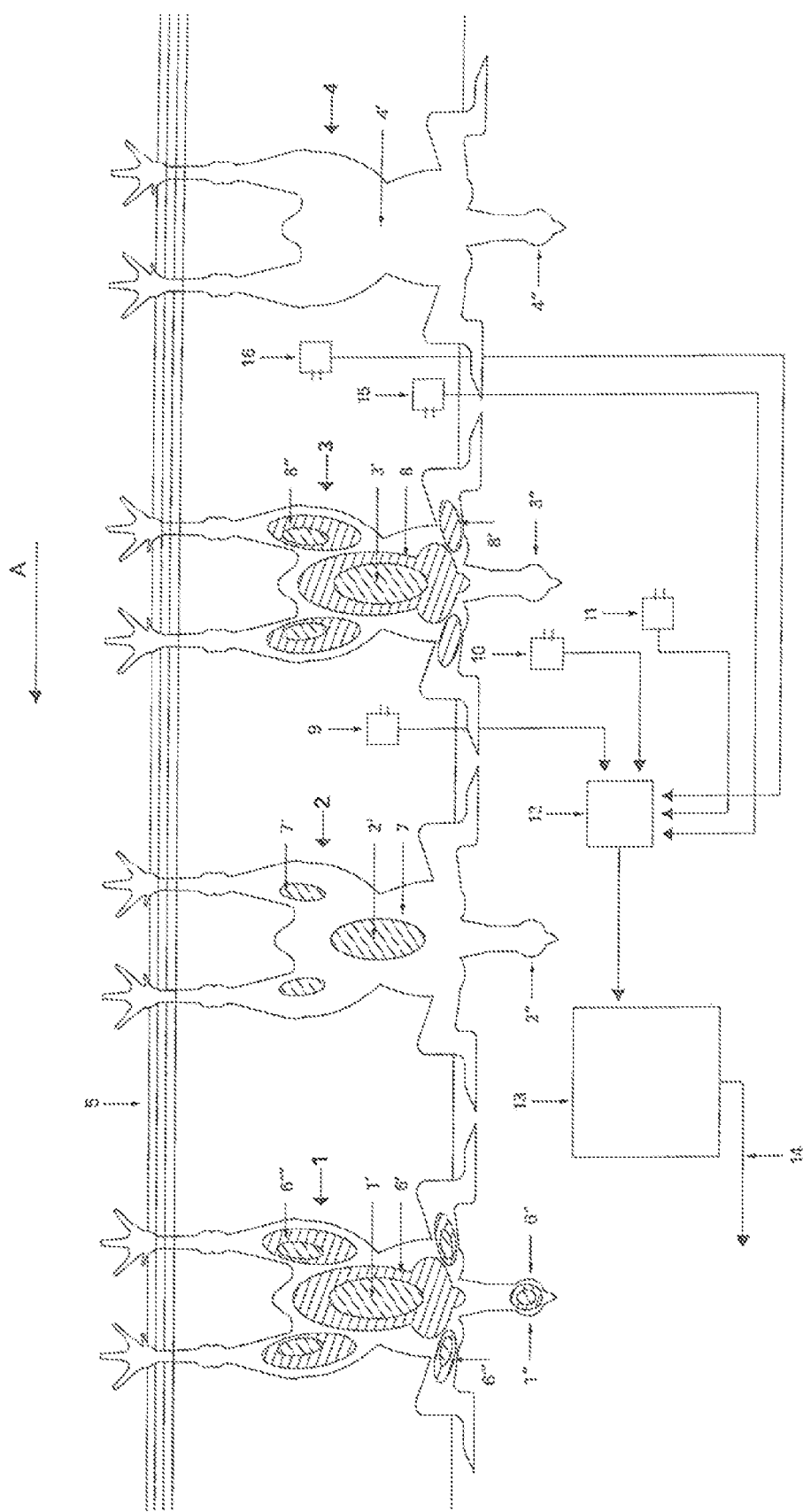

METHOD AND APPARATUS FOR PROCESSING SLAUGHTERED POULTRY

FIELD OF THE INVENTION

The subject matter of the present disclosure relates to a method of processing slaughtered poultry that is conveyed in a slaughter line of a slaughter house in order to establish at the start of the slaughter line whether the poultry was alive or dead upon arrival at the slaughter house. The method comprises the detection of a temperature of the slaughtered poultry when the poultry is suspended by the legs in the slaughter line after stunning of the poultry.

The subject matter of the present disclosure further relates to an apparatus for processing slaughtered poultry according to such a method. The apparatus comprises a slaughter line and temperature detection means that are arranged to detect a temperature of the slaughtered poultry when the poultry is suspended by the legs in the slaughter line.

BACKGROUND OF THE INVENTION

A known apparatus and method are set forth in EP-B-0 819 381. Therein, poultry that is transported to the slaughter house is first stunned, then suspended by the legs, and conveyed further down the line for exsanguination, defeathering, decapitating, visual inspection of the outside, weight determination, evisceration, and veterinary inspection of the poultry carcass and viscera before it gets cooled, portioned, and refrigerated. The determination of whether or not poultry has arrived at the slaughter house dead or alive is merely mentioned in EP-B-0 819 381 as an example in a process which is actually concerned with providing a completely, or almost completely automatic performance of inspection tasks.

SUMMARY OF THE INVENTION

Aspects and advantages of the invention will be set forth in part in the following description, or may be obvious from the description, or may be learned through practice of the invention One object of the invention is to improve the accuracy and reliability of the apparatus and method identified in the field of the invention, to determine whether the poultry arriving at the slaughter line was dead or alive.

A further object of the invention is to prevent as much as possible the occurrence of false positives, that is to say the determination of poultry being alive on arrival which actually arrived at the slaughterhouse dead. Such false positives may for instance occur due to the dead poultry assuming the temperature of immediately adjacent live poultry.

Generally speaking it is therefore an object of the invention to assess the immediate history and status of the suspended poultry.

Still a further object of the invention is to better monitor the process of killing the poultry in the initial phases of its processing in the processing line. The intention here is to improve animal welfare in the poultry's final life stages.

The invention is embodied in a method and apparatus according to any one of the appended claims.

In a first aspect of the invention at least the temperature of the slaughtered poultry at the poultry's breast is detected. It was found that particularly measuring the temperature of the poultry at its breast provides a reliable method for detecting whether the poultry is dead or alive at arrival at the slaughter line. In accordance therewith the apparatus of the invention is characterized in that the temperature detection means are arranged to detect at least the temperature of the slaughtered poultry at the poultry's breast.

An additional advantage of measuring the temperature of the slaughtered poultry at the poultry's breast is that it is then possible to improve animal welfare for future birds. Live birds may have suffered from hypothermia or hyperthermia during transport, depending on the individual location of a bird in a means for transportation, and the environmental conditions existing during transport (temperature, air speed, humidity). By monitoring the breast temperature of the slaughtered poultry, it is possible to detect whether the birds have suffered from hypothermia or hyperthermia. Birds which were alive on arrival, but suffered from cold, will show a relatively cold body compared to other birds. If such birds however suffered from heat, their bodies will be relatively warm.

The accuracy of the method of the invention can be improved by arranging that at least the temperature of the slaughtered poultry at the poultry's head is detected. It is found that particularly during gas stunning, live birds initially try to compensate the elevated $CO_2$ concentration by increased breathing and increased heartbeat, thereby increasing their temperature, especially of the head. Birds which were dead before gas stunning, however, obviously did not breathe at all. Their heads are cold, at least compared to their body, due to loss of heat. However, birds which have been dead for a longer time, will also have a cold head, but will have a more uniform temperature. The temperature of the head can therefore provide a reliable indication whether the concerning poultry was alive or dead on arrival at the slaughter line. In one exemplary embodiment, the apparatus of the invention therefore preferably has the feature that the temperature detection means are arranged to detect at least the temperature of the slaughtered poultry at the poultry's head. Best results may then be achieved when the temperature of the slaughtered poultry is detected both at its breast and at its head. Applying both measurements allows the possibility to prevent the occurrence of false positives.

In another exemplary embodiment in which both temperature measurements are applied, the difference in temperature is detected between the temperature of the slaughtered poultry at its breast and the temperature of the poultry at its head. By looking at the difference between these values it is not only possible to discriminate between birds being dead or alive on arrival, but is also possible (if the birds are dead) to estimate the period of time that the birds have been dead.

Consistent with this exemplary embodiment of the method of the invention, it is also preferred that this exemplary apparatus of the invention is embodied with temperature detection means that are arranged to detect the temperature of the slaughtered poultry at its breast and at its head. Preferably further this exemplary apparatus comprises calculating means connected to the temperature detection means in order to establish the difference in temperature between the temperature of the slaughtered poultry at its breast and the temperature of the poultry at its head.

The sensitivity of detecting death of birds can be augmented in an exemplary method of the invention by arranging that also the temperature of the slaughtered poultry at its thighs and/or wings is detected. Together with the other measurements this provides a first indication that the bird may have been dead on arrival due to the fact that when a bird dies, its blood circulation stops, and the bird's heat loss is no longer compensated, leading to a lower temperature at first especially at the bird's extremities (head, wings, legs). In time, the entire body of the bird will assume the temperature of the environment. Anyway, for a proper detection of birds being dead on arrival, it is beneficial that the temperature profile of the slaughtered poultry is detected at various regions of the poultry's body. Accordingly in the apparatus of the invention, the temperature detection means are arranged to detect the temperature profile of the slaughtered poultry at various regions of the poultry's body.

In another aspect of the method according to the invention, wherein the poultry is exsanguinated by cutting at least one of its blood vessels (preferably the bird's carotid artery), the bleeding of the poultry is detected by detecting the temperature of the blood leaving the poultry. This provides a reliable check on a proper killing procedure following the stunning of the animal. Birds which are processed normally show a thin flow of warm blood during bleeding. This flow can be seen in the heat image. Cold birds will show a colder blood stream, hyperthermic birds will show a warmer blood stream, and non-venesected bird will show no blood stream. So, interpretation of this part of the heat image can reveal hypothermia, hyperthermia, and poor or no venesection. In accordance therewith the apparatus of the invention preferably has temperature detection means that are arranged for detecting the temperature of blood leaving the poultry.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of a single FIGURE, FIG. 1, representing an exemplary embodiment of the method and apparatus according to the invention.

FIG. 1 shows schematically a processing line for poultry embodied as a suspension conveyor 5 moving in the direction of arrow A, in which conveyor 5 with poultry 1, 2, 3, 4 is suspended by the legs.

The FIGURE shows the poultry with isotherms. For example, isotherms 6', 6", 6''', 6'''' are shown in bird 1; isotherms 7, 7' in bird 2; and isotherms 8, 8', 8" in bird 3. No isotherms are shown in bird 4 meaning that this bird 4 is stone cold and apparently was dead way before arrival at the slaughterhouse.

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

During conveying by the conveyor line 5 the temperatures of the poultry 1, 2, 3, 4 is measured with temperature detection means 9, 10. The temperature detection means 9, 10 are positioned, either movable or stationary, along the conveyor line 5 allowing that the temperatures of the passing poultry 1, 2, 3, 4 are measured on an individual basis. Temperature detection means 9 are used to measure the temperature of the slaughtered poultry 1, 2, 3, 4 at the poultry's breast 1', 2', 3', 4', whereas temperature detection means 10 are used to measure the temperature of the slaughtered poultry 1, 2, 3, 4 at the poultry's head 1", 2", 3", 4". As an option it is also possible to add temperature detection means 15 for the wings of the poultry, and temperature means 16 for the thighs of the poultry.

The respective temperature detection means 9, 10, 15, 16 are connected with a processing device or calculating means 12 that can be used for determining a temperature profile of the bird, for instance, by establishing at least the difference between the temperatures measured by the respective temperature detection means 9, 10 that monitor the temperatures of the body and the head of the poultry. The outcome of the calculating means 12 is then used in a control device 13 to establish whether or not the measured poultry 1, 2, 3, 4 was dead or alive on arrival at the slaughter house. Based thereon the control device 13 may provide an output signal via a line 14 that is used as an actuating signal for a separating device (not shown but known for the person skilled in the art) that is used to release the bird that has been established as being dead on arrival from the conveyor line 5. The calculating means 12 and control device 13 may be included in a single processing device or may be separate components.

FIG. 1 illustrates that bird 1 has a relatively hot head 1" as indicated with the isotherms 6", whereas the birds 2, 3, 4 have heads 2", 3", 4" that are relatively cold which is represented by the absence of isotherms. Furthermore according to the isotherms 1' and 3' the body heat of birds 1 and 3 is relatively high, whereas isotherms 2' reveal that the body heat of bird 2 is at a considerable lower level. With respect to bird 2 it is also shown that there are no isotherms in its wings, and little isotherms 7' in its thighs. Bird 4 shows no isotherms at all and is therefore cold all over, meaning that this bird probably died way before arrival at the slaughterhouse. Bird 2 with the isotherms 2' representing an appreciable lower temperature is likely to have died just before arrival at the slaughterhouse. The temperature measurements thus result in that birds 2 and 4 will cause that the control device 13 will provide an actuating signal through line 14 to effect timely removal of these birds from the conveyor line 5. Birds 1 and 3 both have a temperature profile in which there are also appreciable temperatures prevailing in the bird's wings represented by the isotherms 6" for bird 1 and by the isotherms 8' for bird 3, as well as in the birds thighs as represented by the isotherms 6'''' for bird 1 and isotherms 8" for bird 3. These birds 1 and 3 were definitely alive when arriving at the slaughterhouse.

The FIGURE further shows temperature detection means 11 which can be used when the poultry is exsanguinated by cutting one or more of its arteries, amongst which preferably its carotid artery, so that proper bleeding of the poultry 1, 2, 3, 4 can be monitored by detecting the temperature of the blood leaving the poultry.

It is explicitly remarked that the FIGURE is very schematic and is provided with the sole purpose to elucidate the appended claims without intent to limit such claims to what is shown in the FIGURE or discussed in the previous description. While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A method of processing slaughtered poultry that is conveyed in a slaughter line of a slaughter house in order to establish at the start of the slaughter line whether the poultry was alive or dead on arrival at the slaughter house, the method comprising the steps of:
stunning the poultry; and
detecting a temperature of the slaughtered poultry's breast when the poultry is suspended by the legs in the slaughter line after said step of stunning the poultry.

2. A method of processing slaughtered poultry as in claim 1, further comprising the step of detecting a temperature of the slaughtered poultry's head.

3. A method of processing slaughtered poultry as in claim 2, further comprising the step of detecting a temperature of the slaughtered poultry's thighs or wings, or both.

4. A method of processing slaughtered poultry as in claim 2, further comprising the step of detecting the temperature of the slaughtered poultry at various regions of the poultry's body.

5. A method of processing slaughtered poultry as in claim 2, further comprising the step of detecting the temperature of the slaughtered poultry at its head, thighs, wings, or a combination thereof.

6. A method of processing slaughtered poultry as in claim 2, further comprising the step of determining the difference in temperature between the temperature of the slaughtered poultry at its breast and the temperature of the slaughtered poultry at its head.

7. A method of processing slaughtered poultry as in claim 1, further comprising the step of exsanguinating the poultry by cutting at least one of its blood vessels; and
detecting the temperature of the blood leaving the poultry after said step of exsanguinating.

8. An apparatus for processing slaughtered poultry, comprising:
a slaughter line; and
means to establish at the start of said slaughter line whether the poultry was alive or dead on arrival at the slaughter line, said means comprising temperature detection means arranged to detect a temperature of the slaughtered poultry when the poultry is suspended by the legs in the slaughter line, said temperature detection means arranged to detect at least the temperature of the slaughtered poultry at the poultry's breast.

9. An apparatus for processing slaughtered poultry as in claim 8, wherein said temperature detection means are also arranged to detect at least the temperature of the slaughtered poultry at the poultry's head.

10. An apparatus for processing slaughtered poultry as in claim 9, wherein said temperature detection means are also arranged to detect the temperature of the slaughtered poultry at its thighs, wings, or both.

11. An apparatus for processing slaughtered poultry as in claim 8, wherein said temperature detection means are also arranged to detect the temperature profile of the slaughtered poultry at various regions of the poultry's body.

12. An apparatus for processing slaughtered poultry as in claim 8, wherein said temperature detection means are also arranged to detect the temperature of the slaughtered poultry at its breast, head, thighs, wings, or combinations thereof.

13. An apparatus for processing slaughtered poultry as in claim 12, further comprising
calculating means connected to said temperature detection means in order to establish the difference in temperature between the temperature of the slaughtered poultry at its breast, and the temperature of the poultry at its head, thighs, wings, or combinations thereof.

14. An apparatus for processing slaughtered poultry as in claim 13, wherein said temperature detection means are also arranged for detecting the temperature of blood leaving the poultry.

15. An apparatus for processing slaughtered poultry, comprising:
a conveyor line for carrying the slaughtered poultry along the conveying line direction;
a first temperature detection means positioned proximate to the conveyor line and configured for measuring the temperature of the breast of a slaughtered poultry.

16. An apparatus for processing slaughtered poultry as in claim 15, comprising:
a second temperature detection means positioned proximate to the conveyor line and configured for measuring the temperature of the head of a slaughtered poultry.

17. An apparatus for processing slaughtered poultry as in claim 16, comprising:
at least one processing device configured for comparing the temperature of a breast of a slaughtered poultry with the temperature of a head of a slaughtered poultry and providing an output regarding the results of the comparison.

18. An apparatus for processing slaughtered poultry as in claim 17, comprising:
at least one control device in communication with said at least one processing device, said control device configured for providing an actuating signal for a separating device depending upon output of said at least one processing device.

* * * * *